US008137052B1

(12) United States Patent
Schlegel

(10) Patent No.: US 8,137,052 B1
(45) Date of Patent: Mar. 20, 2012

(54) WIND TURBINE GENERATOR

(76) Inventor: Dean J. Schlegel, Eagan, MN (US)

( * ) Notice: Subject to any disclaimer, the term of this patent is extended or adjusted under 35 U.S.C. 154(b) by 722 days.

(21) Appl. No.: 12/288,191

(22) Filed: Oct. 17, 2008

Related U.S. Application Data

(60) Provisional application No. 60/980,580, filed on Oct. 17, 2007.

(51) Int. Cl.
*F03D 7/02* (2006.01)
(52) U.S. Cl. .......................................... 415/4.3
(58) Field of Classification Search .................. 415/4.3, 415/4.2, 4.5, 124.2, 908; 416/37, 11, 170 R; 290/55; 417/334
See application file for complete search history.

(56) References Cited

U.S. PATENT DOCUMENTS

| 4,143,992 A * | 3/1979 | Crook ............................ 415/220 |
| 4,720,640 A | 1/1988 | Anderson et al. |
| 4,832,571 A | 5/1989 | Carrol |
| 5,197,854 A * | 3/1993 | Jordan ............................ 415/119 |
| 5,457,346 A * | 10/1995 | Blumberg et al. ............... 290/55 |
| 5,599,172 A | 2/1997 | McCabe ........................ 417/334 |
| 6,064,123 A | 5/2000 | Gislason |
| 6,132,172 A * | 10/2000 | Li ..................................... 416/11 |
| 6,664,655 B2 | 12/2003 | Vann |
| 6,979,175 B2 * | 12/2005 | Drake ............................. 416/11 |
| 7,063,501 B2 * | 6/2006 | Selsam ........................... 415/4.3 |
| 7,214,029 B2 * | 5/2007 | Richter .......................... 415/4.5 |
| 7,255,527 B2 * | 8/2007 | Hsu ................................ 415/4.3 |
| 2005/0002783 A1 * | 1/2005 | Hiel et al. .................. 415/208.1 |
| 2006/0244264 A1 * | 11/2006 | Anderson et al. ............... 290/44 |

* cited by examiner

*Primary Examiner* — Alexander Gilman
(74) *Attorney, Agent, or Firm* — Eggink & Eggink; Anthony G. Eggink; Katrina M. Eggink

(57) ABSTRACT

A wind turbine generator assembly comprising a support tower and a turbine assembly mounted in a downwind position with respect to the support tower. The turbine assembly comprises a cowling assembly and a spoked wheel having a plurality of relatively short blades mounted radially outward with respect to and downwind the cowling assembly. Each blade has an airfoil cross-sectional configuration of a predetermined structure to provide lift. The bladed wheel is coupled to a generator to produce electricity. The support tower has an upper tower portion having a biased hinge assembly with respect to the lower tower position to permit the turbine to pivot in high wind conditions. The support tower further has a rotating mechanism above the lower tower portion and below the biased hinge assembly to allow the turbine to rotate with respect to wind direction and a pivot assembly is provided to permit the turbine assembly to be brought to ground level for erecting and maintenance purposes.

20 Claims, 6 Drawing Sheets

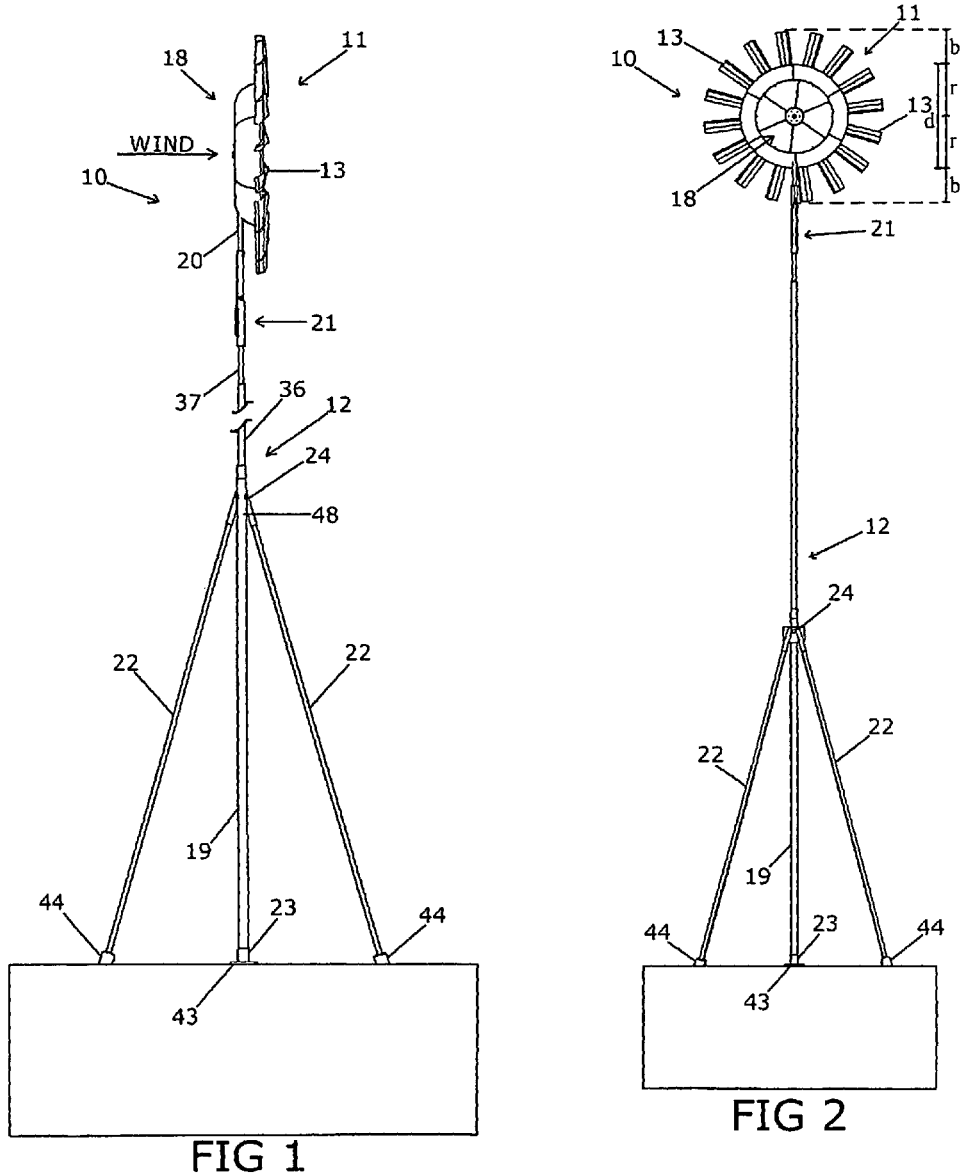

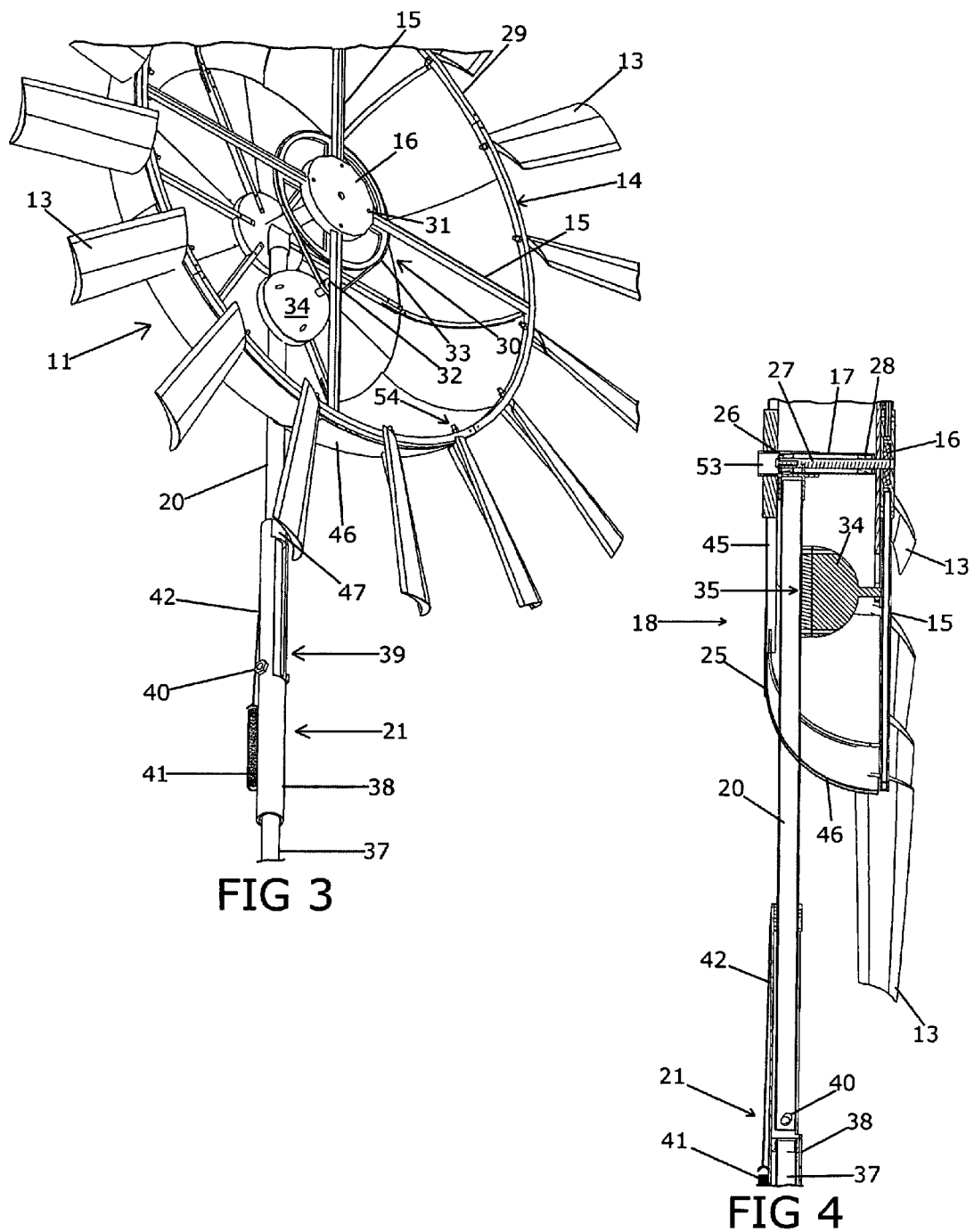

WIND TURBINE GENERATOR

This application claims the benefit of U.S. Provisional Application Ser. No. 60/980,580, filed on Oct. 17, 2007.

BACKGROUND OF THE INVENTION

This invention relates generally to a wind driven turbine generator. Particularly, the invention relates to a turbine generator constructed and arranged to increase efficiency relative to standard wind turbine designs. The turbine generator of this invention assembly utilizes a bladed wheel having a larger number of shorter blades positioned at an optimal distance from the axis of rotation. The blades rotate at a predetermined angle relative to the wind flow to allow for the maximum capture of force to provide increased torque. The assembly utilizes a cowling structure mounted upwind of the turbine blades to increase power output due to the acceleration of wind flow around the cowling structure.

The general practice of obtaining energy from the wind has been known for many years, for example, since the advent of sailing vessels. Wind energy technology has evolved and currently, large three bladed wind turbines seen across the country have become the standard model for capturing wind energy for conversion to electricity. Considering rotational blade theory, the airflow effecting a section of blade is comprised of two components. Wind flow perpendicular to the blade plane of rotation is one component and which is generally uniform across the swept area of the blades. The second component, the airfoil section, relates to the rotational blade movement or spinning about an axis parallel to the wind driven air. This second or internally driven component of the relative airflow varies linearly along the length of the blade and is equal to the rate of rotation (a constant at any instance in time) and the radius of the airfoil section. The latter component requires that spinning airfoils be twisted so the blade meets the relative wind in an efficient manner. One drawback of the standard long blade designs is that when spinning at a constant rate, only a portion of the blade is creating useful torque in the most efficient manner. The area of the blade nearest the rotation axis has a very small component due to its short radius. While the outer end blade portion has a very high self induced component due to its large radial position, the twist in the blades to compensate for this effect means that the orientation of the outer section of the wind turbine blade is nearly perpendicular to the direction of the wind flow. Although this outer section creates a large amount of lift, the lifting force is also nearly perpendicular to the plane of rotation of the turbine blade. Since only the lift component in the plane of rotation is useful, most of the lift generated by this outer blade section results in overall downwind drag on the entire wind turbine apparatus.

The forces of lift and drag, as well as the torsional and vibratory effects of turbulence and wind variance across the swept area of the blade, coupled with the length of the blades requires that the blades be strong and lightweight. This consideration greatly affects the cost of producing these and other wind turbine components. Since a major concern in the renewable energy field relates to system payback in comparison to traditional energy costs, such as fossil fuel sources, high production costs can be as disadvantageous as poor efficiency.

Other prior art structures have incorporated mechanisms to increase the wind flow prior to meeting the blades by using a nozzle or constricted cowling to attempt to take advantage of the venturi effect. However, back pressure causes these mechanisms to be ineffective. Others, such as the device of U.S. Pat. No. 7,214,029, utilize a cowling to take advantage of increased airspeed flowing around an obstruction, however, this structure only attempts to harness the accelerated airflow area. It has been found that the area of increased speed is only provided in such a small fraction of the swept area and that the blades used are too short to gain an appreciable increase in power. This structure is complex, inefficient and limited in effectiveness. The wind turbine generator assembly of the present invention uses a plurality of shorter blades rotating outwardly and behind a cowling assembly to alleviate the above enumerated problems and difficulties.

SUMMARY OF THE INVENTION

A wind driven turbine generator of the invention may generate approximately one kw of electrical power and have an overall height of approximately 60 feet, for example. The turbine generator assembly of this structure may have a cowling assembly and wheel assembly having a diameter of approximately 6 feet and utilizing approximately 16 spaced peripheral blades, each having a length of approximately two feet. The blades each preferably have an airfoil cross-section of varying pitch from base to tip of approximately 35 to 55 degrees and a mid section pitch of 45 degrees. The turbine generator may be scaled up or down in kw power production by adjusting the cowling and wheel diameter and/or the length and number of blades. The turbine generator utilizes a biased rotatable support structure which allows the turbine assembly to tilt in high wind conditions. Turbine generator access means such as a pivot or telescoping support mechanism or mounting on an accessible structure such as a roof, is further provided.

The present invention provides a wind turbine generator assembly which increases power production efficiency for a wind swept blade area and which is both economical and marketable. The wind turbine assembly obtains more power by utilizing an increased number of blades and using the most efficient portion of the blade in contrast to increasing the swept area by lengthening the blades to increase power output as in prior art structures. Whereas a typical three bladed wind turbine with a swept diameter of ten feet, for example, may use three blades, each five feet in length for a total blade length of 15 feet, the turbine of the present invention may incorporate up to 20, two feet in length blades, for a useful blade length of forty feet, for example. Furthermore, all of the blade area is positioned within the three and five feet radius section of the swept area producing greater torque than prior art structures, due to the force times length consideration in the production of torque. The enhanced power output is provided by having only a blade section of ten degrees either side of the most productive slice of blade being approximately 45 degrees. Additional increased efficiency is provided due to the accelerated boundary layer caused by the air flowing around the cowling structure and increasing the angle of incidence with the corresponding increase in effective lift, torque and power. The cowling structure is provided because the angle of incidence requirement for the most effective placement of the blade section requires blade location a moderate distance from the rotational axis.

The advantage of the present invention is to maximize efficiency while reducing the cost of the wind turbine structure. The support structure to raise and hold the turbine generator above the ground provides another important consideration. The present invention utilized a cowling structure and a spring/hinged support structure. In the conventional three bladed wind turbine design, when the wind is blowing at a higher velocity that the generator or support structure is designed to handle, the rotating blades are either turned parallel to the wind direction or are braked to thereby reduce the forces that may cause support structure failure. By using a relatively large cowling, as provided in the present invention, the sideways furling becomes impractical due to the large tail needed to accomplish the furl, or ineffective through the use of braking. Therefore, the present invention incorporates a hinged support cylinder to ensure that the turbine generator does not exceed its designed power input and that the support structure is not overloaded. The cowling structure has a generally flat front portion and a curved outer peripheral section so that the airflow is directed to meet the blades perpendicular to the plane of rotation. This configuration has the effect of greatly reducing the area facing the wind when the turbine is subject to high wind conditions by allowing the wind turbine to pivot or "lay down" with respect to the support structure so that only the cross sectional area of the flattened turbine profile is exposed to wind flow. For a specified size wind turbine of the present design the area facing the wind can be reduced to approximately one tenth of the swept area when the turbine is furled relative to when the turbine is unfurled. This effect on the strength and thus the cost of the support structure is another important aspect of the present invention.

The present invention is a downwind wind turbine assembly which is always directed into the wind and which has means to tilt in the downwind direction when high winds are encountered. A hinge structure is provided to the support pole allowing the wind turbine to move toward a flat or horizontal position in large wind velocities. In this configuration the exposed area decreases and therefore greatly reduces the strength needed in the support tower structure. The spring tension needed to maintain the appropriate upright position and to tilt at the correct wind speed may be maintained through spring size, number of springs, and the relaxed position on the spring mechanism.

The wind turbine assembly also provides accessibility for installation and maintenance purposes. The present invention incorporates a support structure wherein the primary support cylinder is supplemented by a four leg or two pair secondary support structure that is attached to the primary cylinder at a height of about one third the overall height of the wind turbine structure. Since the bottom of the primary cylinder or pole is slightly above ground level, the weight of the entire apparatus is supported by this secondary structure. The primary pole is secured to the in-ground support by a collar that can be slid up the pole to allow tilting for turbine access purposes. The top of the secondary support structure has a pivot pin that connects the two pairs of support legs. The primary pole has a collar that connects the two pieces of support pole pipe and also has a hole that the pin in the secondary support system passes through, allowing the primary support structure to rotate. The function of the primary cylinder is not to support the weight of the turbine assembly, but to provide lateral stability to the tower structure. The secondary support structure supports the weight and also contributes lateral stability support. Thus, a smaller diameter cylinder or pole may be used for the lower section and the overall cost of the support arrangement is less than a monopole system because the lateral support is maintained by the bottom structure. The support system of the present invention provides the benefits of both a farm style windmill tower and a monopole wind turbine tower and has the ability to tilt for maintenance purposes.

These and other benefits of this invention will become clear from the following description by reference to the drawings.

BRIEF DESCRIPTION OF THE DRAWINGS

FIG. 1 is a lateral plan view showing the wind driven turbine generator assembly of the invention;

FIG. 2 is a frontal view of the wind turbine generator assembly of FIG. 1;

FIG. 3 is an enlarged perspective view showing the rear of the wind turbine generator of the invention;

FIG. 4 is a lateral plan view partially in section of the turbine generator of FIG. 3;

DESCRIPTION OF THE PREFERRED EMBODIMENTS

Figures 5, 6:
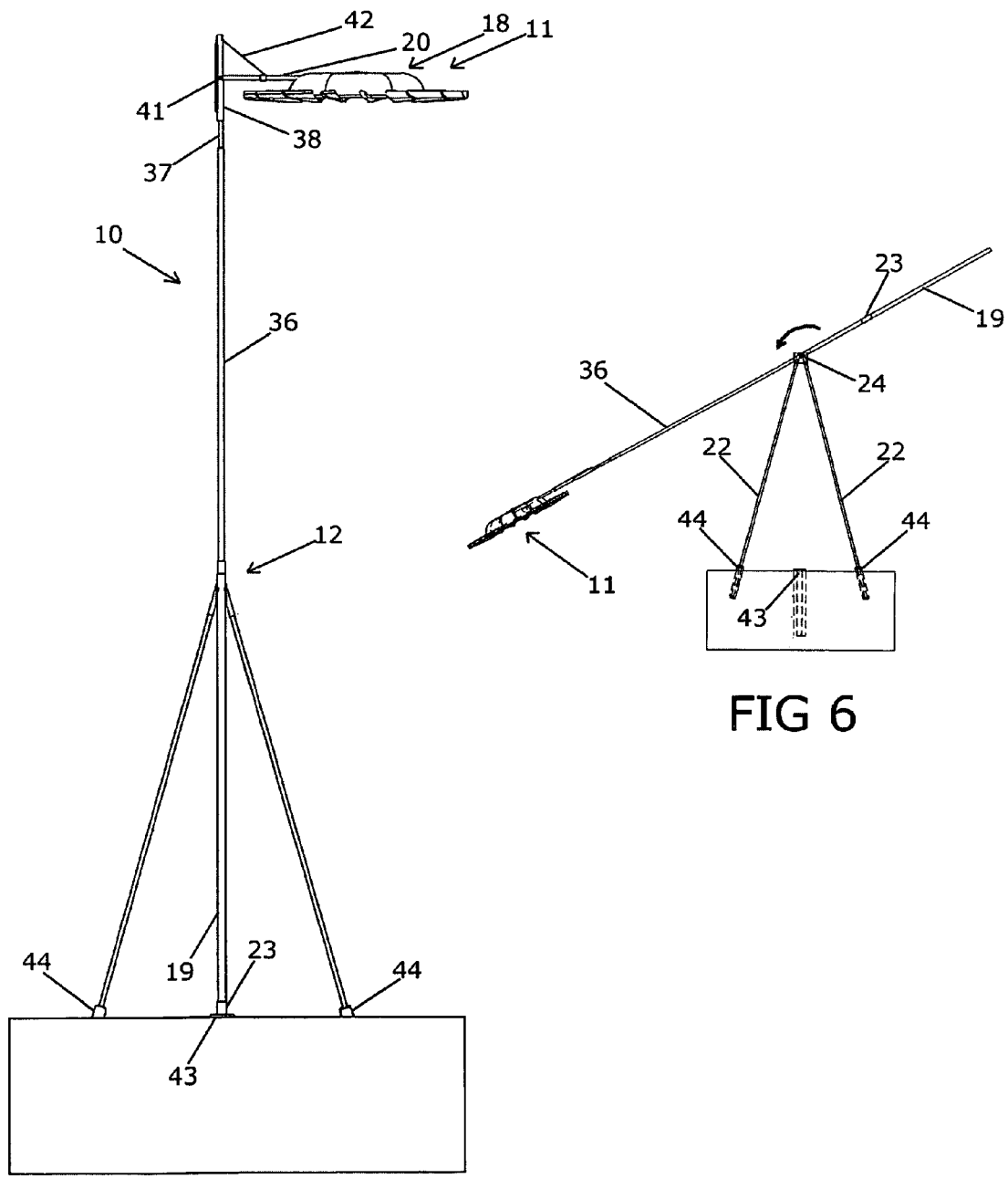
FIG. 5 is a lateral plan view showing the turbine generator in a horizontal position.
FIG. 6 is a lateral plan view showing the wind turbine generator assembly in a tilted position with respect to the support tower structure.

Referring to FIGS. 1-4 of the drawings, the present invention relates to an electricity producing wind driven turbine 10 having a turbine generator assembly 11 mounted in a downwind configuration on a support tower 12. A cowling assembly 18 is provided to direct and accelerate the airflow outward towards the circumference of a wheel assembly 14. The wheel assembly 14 is shown mounted on a rotatable shaft 27 on the downwind side or behind the front surface 45 of the cowling assembly 18. The shaft 27 is positioned along the axis of the cowling structure 25, and is supported by bearings 26 and 28. The wheel assembly 14 has a plurality of blades 13 mounted at its outer circumference for capturing the wind power. The wheel assembly 14 drives a generator assembly, e.g. stator/rotor assembly 34, which produces the desired electrical output.

Figure 8:
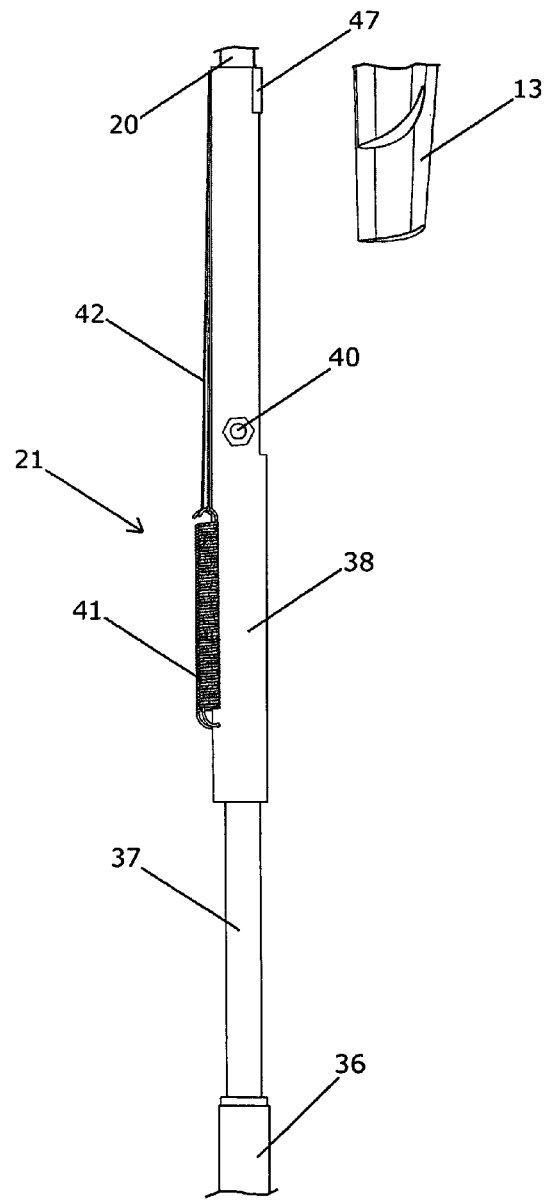
FIG. 8 is a close-up plan view of the hinged/spring mechanism of the support tower.
Figure 9:
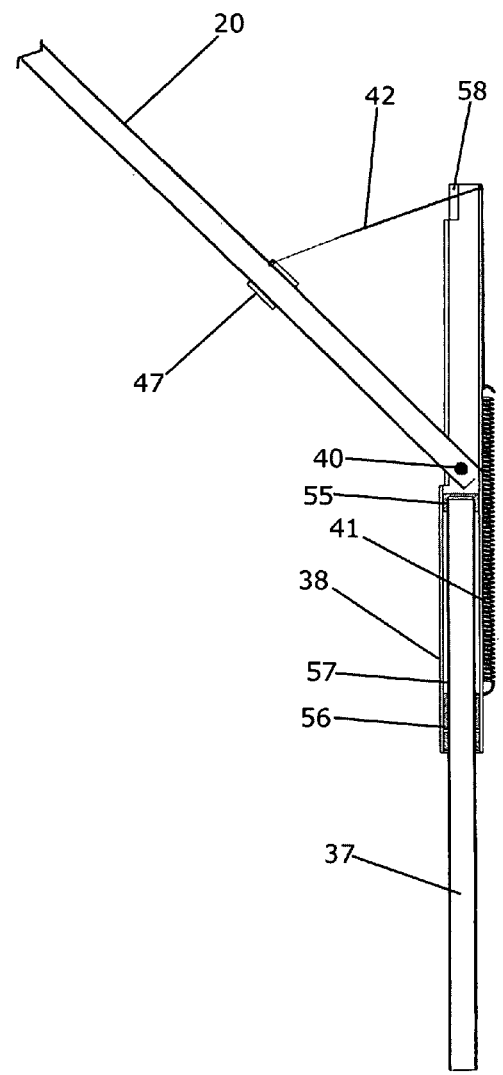
FIG. 9 is a close-up view partially in section showing the rotatable upper support structure.

The components of the turbine generator assembly 11 are shown mounted atop a support tower structure that allows for 360° rotation about a vertical axis (FIG. 9) and which also allows a 90° rotation or tilting about a horizontal axis as shown in FIGS. 5, 8 and 9. The latter 90° rotation or tilting of the structure is shown provided by a spring mechanism 41 and cable 42 constructed and arranged to maintain the turbine generator assembly 11 in the vertical position during normal operation. The hinged support structure allows the turbine generator assembly 11 to automatically position itself in a horizontal downwind manner in high wind conditions. This spring hinged and rotational support system is provided at the top of the primary support structure which consists of generally two sections of elongated cylinders.

Figure 7:
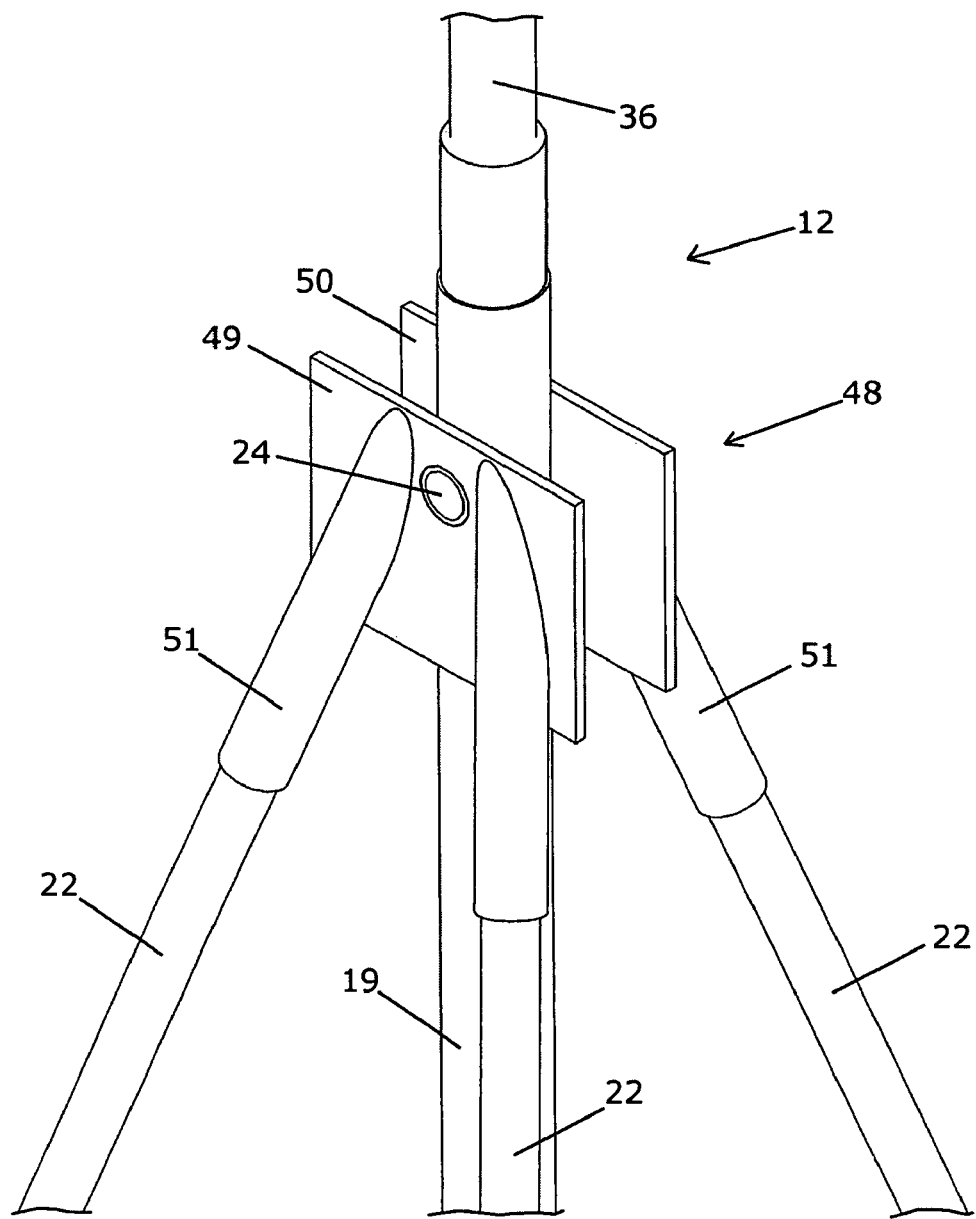
FIG. 7 is a close-up view in perspective of the tilting mechanism of the support tower.

As further shown in FIGS. 6 and 7, cylinders 36 and 19 are connected by a cylindrical coupling having a horizontally disposed hole through the center. A pivot pin 24 extends through this hole allowing the main support cylinders to rotate about pin 24. Pin 24 is shown supported on each side by plates 49 and 50, each having a pair of leg mounting cylinders 51 extending outward at approximately 15 degrees in both the direction parallel and perpendicular to the face of each plate 49 and 50. Four support poles 22 are secured in the mounts 51 and are connected at the bottom to concrete supports in the ground. As shown in FIGS. 5 and 6, a cylindrical collar 23 is provided at the bottom of the lower primary cylinder 19 and having a range of motion in the vertical direction of the primary support cylinder 19. Collar 23 in the lower position couples the primary support cylinder to a concrete anchor 43 positioned in the ground, and in the upper position this coupling is released, allowing the primary support cylinders 19 to rotate about pivot pin 24. This arrangement allows for the support structure to assume a position wherein the turbine structure may be lowered near the ground to provide accessibility to the wind turbine components. In summary, the wind turbine 10 is a downwind, horizontally furled, large cowl, radial bladed structure having a tilt pole support.

Referring to the drawings, FIG. 1 is a side view showing the wind driven turbine apparatus 10 mounted on a support tower 12. FIG. 2 shows the upwind front view of the wind driven turbine 10. A cowling assembly 18 as further shown in FIGS. 3 and 4 has a flattened front or face 45 with a curved periphery 46, sectional sphere of revolution, however, it may have a shape consisting of an extended front as to form a half sphere or an elongated cone. The shape of the cowling may vary so long as airflow is directed outward to the circumference of the blade 13 location. The cowling assembly 18 allows for a generally horizontal wind flow immediately prior to the plane of the leading edge of the blades 13. Upper support cylinder 20 of hinged spring assembly 21 connects the cowling structure 25 to the support tower 12. Cylinder 20 is shown extending through peripheral portion 46 of cowling 18 and adjacent the interior of face 45 so that the turbine assembly 11 is essentially downwind with respect to cylinder 20 of the support tower. The support tower 12 has an upper primary support cylinder 36, shown in FIG. 1, a lower primary support cylinder 19, four support legs 22, shown connected to a support tower top assembly 48. The top assembly contains a pivot pin 24 which extends through a horizontal hole in the cylinder portion to connect primary supports 19 and 36. Support 36 has connecting receptacles 51 for support legs 22 as shown in FIG. 7. The bottom of the support legs 22 are shown connected to supports 44 on a concrete foundation in FIGS. 1 and 2. A base collar 23 connects lower primary cylinder 19 to support 43 held by a concrete foundation. The collar 23 can be slid up cylinder 19 to release the connection of support 19 from foundation support 43.

FIGS. 3 and 4 show a more detailed view of the turbine generator assembly 11. The blades 13 are shown mounted to the circumference of a wheel structure 14 which consists of hub 16, circumferential members 29 and interconnected by spokes 15. The hub 16 is shown affixed to a drive shaft 27 in FIG. 4 and which rotates inside bearings 26 and 28. The bearings are mounted within horizontal support cylinder 17, which is shown connected to the upper end of the hinged pole 20. Also mounted on the shaft 27 is a pulley 31/drive belt 33 arrangement, which in turn drives a smaller pulley 32, that is mounted on a stator rotor type generator assembly 34. The connection means or ratioing mechanism 30 between the bladed wheel 14 and the generator 34 may be a gearbox or a planetary gear arrangement which are within the scope of the present invention. Also within the scope of the invention are permanent magnets mounted on wheel assembly 14 and wherein coils are mounted to the cowling assembly 18 to form the stator and rotor of a generator apparatus. A second wheel may also be added wherein the wire coils are mounted to the first wheel and a second wheel contains the permanent magnets and is made to rotate in the opposite direction than the first wheel due to the blades being mounted to allow for this counter rotational spin. The latter two configurations would allow for a direct drive of the rotor and/or stator of the generator apparatus. The general configuration shown lends itself to a directly driven generator in that such a generator would need to have a relatively large diameter to accommodate the relatively low rotational speeds of the wind driven turbine apparatus. Maximum power generation would be accomplished with such a configuration as losses due to torque and power transmission would be minimized.

Figure 10:
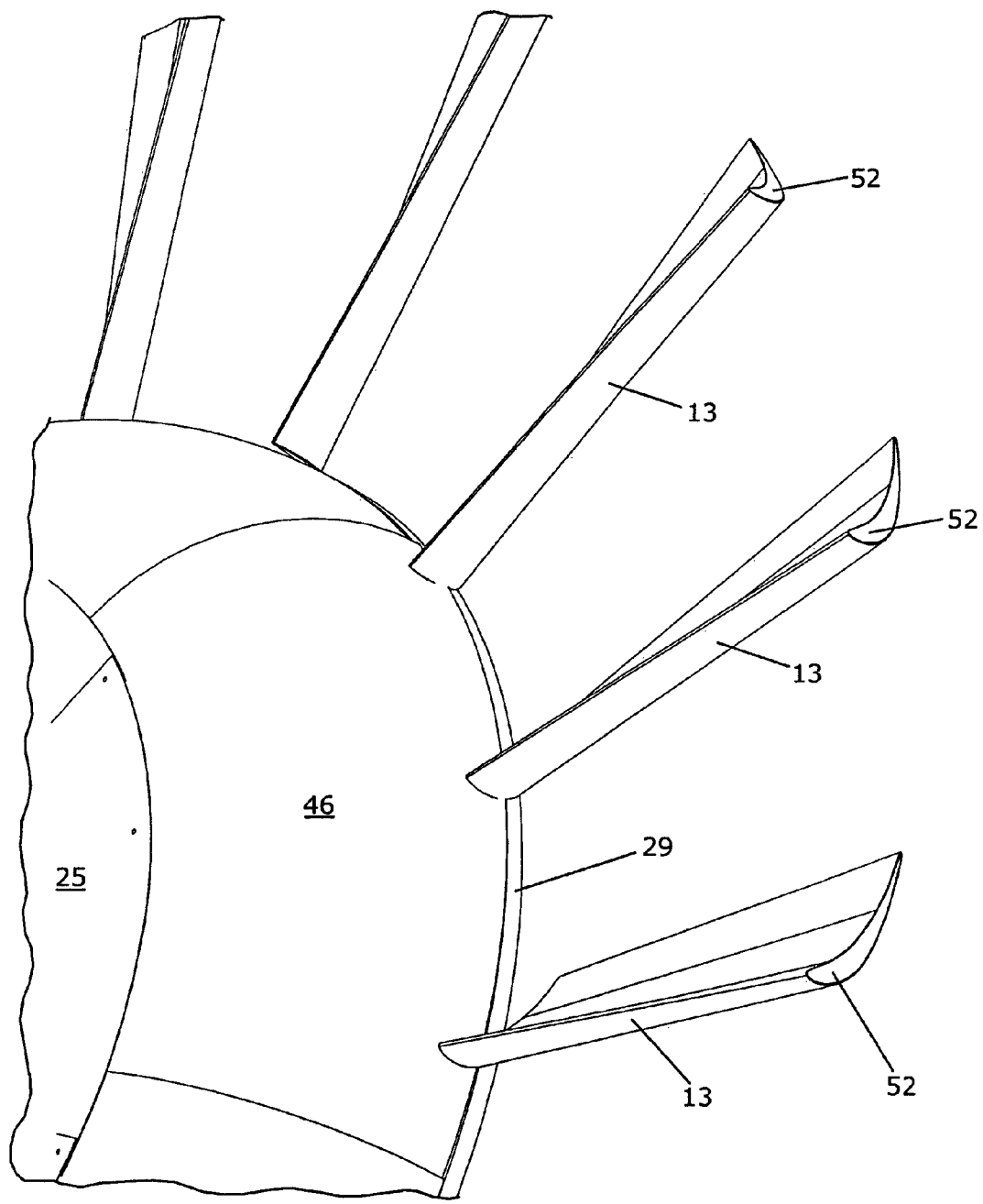
FIG. 10 is a close-up view in perspective of the blade structure of the turbine assembly of the invention.

The wind turbine generator 11 utilizes a larger number of relatively shorter blades 13. The blades are constructed to align at their mid portion at an angle of approximately 45 degrees to the direction of wind flow, the most efficient part of an airfoil used to capture the energy. As shown in FIG. 10, the wind turbine blades are positioned such that the midpoint of the blade is set at an incident angle of 45 degrees to provide a base or root incident angle of approximately 35 degrees and a blade tip incident angle of approximately 55 degrees. The blades 13 are shown mounted having an airfoil cross section 52 on a spoked wheel 29 allowing for the root of the blades to be a substantial distance from the axis of blade rotation producing a high torque level as it is equal to the radius times the force on the blades. The wheel is coupled to a generator for generating electricity. The use of a relatively large wheel allows for the addition of a cowling upwind of the blades. The construction of the cowling increases the airspeed of the wind to the root section area of the blade. The increased speed is due to the air accelerating to move around the cowling swept area. The effect on the root section of the blade is to increase the effective angle of attack of the root section of the blade increases the lift on this section to increase torque and power. The cowling allows the position of the blades downwind of the support to eliminate the need of a large tail to keep the wind generator pointed into the wind. As shown particularly in FIGS. 2-4, the blades 13 are not shrouded and extend radially outward from the circular periphery of cowling 18. Each blade 13 is shown having a length less than the diameter of the cowling 18. The diameter of the cowling 18 is shown designated as "d", the radius is shown depicted as "r", and the length of the blade 13 is shown designated as "b".

Referring again to the preferred embodiment and FIGS. 3 and 4, the upper hinged support cylinder or pole 20 is mounted via a pivot pin 40 to a hinged attachment sleeve 38 having opening 39. Since the attachment sleeve 38 is of a larger diameter than the upper support cylinder 20, a positioning collar 47 is placed on pole 20 to allow for a circumferential positioning of pole 20 relative to sleeve 38. A cable 42 is shown connected to the upper hinged support cylinder 20 at a position near the positioning collar 47. The cable 42 extends over (or through a hole) in the attachment sleeve 38 and is shown connected to a spring 41. The spring 41 is connected to the lower portion of the attachment sleeve, and serves to hold the wind turbine apparatus 11 in the normal vertical operating position as shown in FIGS. 1 through 4. Mounted on the inner circumference and protruding from the lower portion of the attachment sleeve 38 is a lower hinged support cylinder 37. Retaining rings are used to allow for rotation of sleeve 38 about pole segment 37, but eliminate any vertical movement between the two components. The aforementioned components located above the lower hinged support cylinder 37 comprise the wind driven turbine assembly and may be mounted independently on any support system such as a tower, a monopole, or onto even the roof of a building or other structure.

Referring to FIG. 9, cylindrical sleeve 38 is shown in sectional view having upper bearing 55 and sleeve 56 positioned about the upper end of support cylinder 37. Sleeve 56 is attached to sleeve 38 and both rotate about cylinder 37. Inner sleeve 57, attached to cylinder 37, is shown extending vertically between bearing 55 and sleeve 56 and horizontally between sleeve 38 and cylinder 37 to thereby secure the structure and to frictionally restrict the rotation of the turbine generator assembly 11 in wind shifting conditions and to minimize the torsional effects on the drive shaft 27 generated by the changing angular momentum of the bladed wheel, particularly under small changes in wind direction. Further shown, is the pivotable upper cylinder 20 with respect to pivot pin 40 which is supported by cable 42 and spring member 41. Positioning collar 47 attached to cylinder 20 is also shown with respect to seat opening 58 at the upper end of cylindrical sleeve 38. Although a spring/cable arrangement is shown herein, other biasing mechanisms known in the art may be utilized.

Referring to FIGS. 5 and 8, the hinged spring assembly 21 allows for horizontal furling of the wind driven turbine unit 11. As shown in FIG. 5, the turbine unit 11 moves to a horizontal configuration when exposed to winds higher than the operational range of the unit. This configuration allows for a reduced wind facing area which greatly reduces the horizontal stress on any support system used. It also reduces the speed of rotation of the bladed wheel as the blades will no longer be positioned to catch the energy of the wind and will in fact be moving into the wind on one side of the bladed wheels movement.

The preferred embodiment of the invention includes a support pole that allows for tilting the unit towards the ground for accessibility ease for purposes of installation and maintenance as shown in FIG. 6. This support structure consists of an upper primary support pole 36 and a lower primary support pole 19 connected together by the collar of the support tower top unit. A pivot pin 24 extends through this collar and between two plates 48 and 49, as shown in FIG. 7. Thus the connected primary support poles 19 and 36 are able to rotate about the pivot pin 24 when the lower collar 23 is slid up the pole breaking the connection between the in ground support 43 and the lower support pole 19. This can be accomplished due to the secondary support poles 22 being able to support the weight of all besides these secondary support poles. The secondary support poles are shown connected to the ground via supports 44, and are connected on the transverse end to the support tower top unit 48. The purpose of the secondary support poles is twofold. In the upright normal operating position the lower support collar 23 connects the lower primary pole to the support for this pole 43. The primary pole structure can withstand some of the horizontal stress created by the wind interaction on the entire apparatus. The secondary support poles 22 augment this stress support for the lower portion of the entire support structure. In the tilted position for installation or maintenance the secondary support poles carry the weight as the entire apparatus is tilted down. It is important to note that this operation should be conducted in low wind conditions to alleviate undue horizontal stress on the secondary support poles when the unit is in this tilted configuration.

The cowling assembly 18 may be constructed of PVC cowling shell pieces, as shown in FIG. 10, mounted to a PVC cowling support structure. The latter assembly 18 may be suited for manufacturing and shipping cost considerations. The cowling may, however, be constructed of a single formed piece or any combination of separate components constructed of a variety of materials. The blades and wheel assembly of the preferred embodiment may be constructed of PVC, whereas the remaining components, e.g., the tower components, are preferably constructed of steel or like materials. In the spirit of this invention, with so many variables for cross sectional, wall thickness, strength and weight of the components, a large variety of metals and plastics could be used in the production of these components.

Although this invention is described relative to using airflow as the driving medium, any free flowing medium such as an ocean current or river, for example, would produce the same operational benefits.

As many changes are possible to the wind turbine generator of this invention, utilizing the teachings thereof, the description above and the accompanying drawings should be interpreted in the illustrative and not the limited sense.

That which is claimed is:

1. A wind driven turbine to generate electricity comprising:
   a) a tower assembly having a lower support structure and an upper support structure with a top portion;
   b) a turbine generator assembly mounted to said top portion of said upper support structure of said tower assembly, said turbine generator assembly having a cowling assembly with a central axis, said cowling assembly having a generally circular face and a curved periphery for directing wind;
   c) a rotatable generally circular wheel structure positioned behind said curved periphery of said cowling assembly, said wheel structure having a plurality of blades mounted thereto, said blades extending outwardly with respect to said curved periphery of said cowling assembly;
   d) a drive assembly in communication with said wheel structure;
   e) a stator/rotor assembly driven by said drive assembly, said stator/rotor assembly having means to transmit electrical current therefrom; and
   f) said lower support structure having a plurality of angled support members and a pin member structure to said angled support members whereby said upper support structure is pivotable with respect to said lower support structure, said upper support structure having a lower support cylinder with means to fix and release said upper structure for pivoting about said pin member, whereby said turbine generator assembly may be pivoted downward with respect to said lower support structure when said lower support cylinder of said upper structure is released.

2. The wind driven turbine of claim 1, wherein said upper support structure includes a cylindrical member having a hinged/spring assembly to permit said turbine generator assembly to pivot with respect to said lower support structure.

3. The wind driven turbine of claim 2, wherein said cylindrical member of said upper support structure is rotatable with respect to said lower support structure.

4. The wind driven turbine of claim 3, wherein said upper support structure includes a lower support cylindrical member having a slidable collar for releasing the bottom of said lower cylindrical support member.

5. The wind driven turbine of claim 1, wherein each said blade has a base and a tip and a variable pitch and wherein said pitch varies from said base to said tip such that the angle between the blade section chord and the wind direction varies from approximately 25 to 65 degrees.

6. The wind driven turbine of claim 5, wherein said angle between the blade section chord and the wind direction varies from said base to said tip from approximately 35 to 55 degrees and wherein said midsection of said blade has an angle of approximately 45 degrees.

7. The wind driven turbine of claim 1, wherein said drive assembly comprises a speed ratioing system to transfer a rotational force from said wheel structure to said stator/rotor assembly.

8. The wind driven turbine of claim 1, wherein a fixed support cylinder extends from said top portion of said upper support structure, and wherein a rotatable shaft is positioned in said fixed support cylinder, wherein said cowling assembly is mounted to one end of said support cylinder and wherein said wheel structure has spokes and a hub and wherein said hub is mounted to said rotatable shaft.

9. The wind driven turbine of claim 1, wherein said blades are non-shrouded and wherein each said blade has a length less than the diameter of said cowling.

10. A wind driven turbine assembly comprising:
   a) a support tower structure having a lower tower structure and an upper tower structure, said upper tower structure being pivotable with respect to said lower tower structure, said upper tower structure having a first cylinder and a second cylinder with an upper end;
   b) a pivoting assembly joining said first cylinder and said second cylinder, said pivoting assembly including biasing means;
   c) a support cylinder mounted to said upper end of said second cylinder, said support cylinder having a rotatable shaft extending therethrough;
   d) a generally circular cowling structure mounted to one end of said support cylinder, said cowling structure having a face, a curved periphery and a specified diameter;
   e) a generally circular wheel structure having spokes and a hub mounted to one end of said rotatable shaft, said wheel structure having a plurality of blades mounted thereto, said blades extending outwardly with respect to said curved periphery of said cowling structure, each said blade having a specified length, said specified blade length being less than said specified diameter of said cowling structure;
   f) a stator/rotor assembly mounted behind said cowling structure, said stator/rotor assembly having drive means in communication with said rotatable shaft; and
   g) said biasing means including a hinged assembly joining said first cylinder and said second cylinder of said upper tower structure to thereby permit the pivoting of said cowling structure and said rotatable wheel mounted to said support cylinder in high wind conditions.

11. The wind driven assembly of claim 10, wherein said lower tower structure includes a plurality of angled support members.

12. The wind driven turbine assembly of claim 11, wherein said angled support members include opposing plate members and wherein a pin extends between said plates and through said upper tower structure.

13. The wind driven turbine assembly of claim 10, wherein said blades have a variable pitch and wherein said pitch varies such that the angle between the blade section chord and the wind direction varies from the base to the tip of said blades from approximately 25 to 65 degrees.

14. The wind driven turbine assembly of claim 10, wherein said drive assembly comprises a speed ratioing system to transfer a rotational force from said wheel structure to said stator/rotor assembly.

15. A fluid driven turbine assembly to produce electrical power comprising:
   a) a support tower structure having an upper end;
   b) a turbine assembly mounted in a down fluid flow configuration with respect to said upper end of said support tower structure, said turbine assembly comprising a fixed, generally circular cowling structure having a curved periphery and a generally circular, non-shrouded wheel structure mounted for rotation behind said cowling structure, said circular wheel having a plurality of spaced blades mounted thereto, said circular cowling structure having a specified diameter;
   c) a generator assembly in communication with said circular wheel; and
   d) said blades each having a variable pitch from blade base to blade tip and wherein the center pitch of each said blade is approximately 45 degrees with respect to fluid flow direction, each said blade having a specified length and wherein said blade length is less than said specified diameter of said cowling structure.

16. The fluid driven turbine assembly of claim 15, wherein said circular wheel is mounted to a rotatable shaft.

17. The fluid driven turbine assembly of claim 15, wherein said support tower has rotation means, whereby said turbine assembly rotates with respect to fluid flow direction.

18. The fluid driven turbine assembly of claim 15, wherein said support tower has tilting means to pivot said turbine assembly in high flow conditions.

19. The fluid driven turbine assembly of claim 15, wherein said support tower has means to lower said turbine assembly.

20. The fluid driven turbine assembly of claim 15, wherein said blades have a length less than the diameter of said cowling.

* * * * *